United States Patent [19]
Juergens et al.

[11] Patent Number: 5,677,078
[45] Date of Patent: Oct. 14, 1997

[54] METHOD AND APPARATUS FOR ASSEMBLING ELECTROCHEMICAL CELL USING ELASTOMERIC SLEEVE

[75] Inventors: Tristan Juergens, Black Hawk; Thomas P. Walker, Denver, both of Colo.

[73] Assignee: Bolder Technologies Corp., Golden, Colo.

[21] Appl. No.: 534,790

[22] Filed: Sep. 27, 1995

[51] Int. Cl.⁶ .................................................. H01M 2/30
[52] U.S. Cl. .............................. 429/94; 429/54; 429/181; 29/623.2
[58] Field of Search ............................... 429/53, 54, 72, 429/82, 94, 180, 181; 29/623.2

[56] References Cited

U.S. PATENT DOCUMENTS

| | | | |
|---|---|---|---|
| 3,235,411 | 2/1966 | Bronstert | 29/623.2 |
| 3,704,173 | 11/1972 | McClelland et al. | 429/181 X |
| 4,006,282 | 2/1977 | Antoine | 429/181 |
| 4,296,186 | 10/1981 | Wolf | 429/54 |
| 4,611,395 | 9/1986 | Phillips et al. | 29/623.2 |
| 4,927,719 | 5/1990 | Ashihara et al. | 429/54 |
| 5,047,300 | 9/1991 | Juergens | 429/94 |
| 5,051,323 | 9/1991 | Murphy | 429/181 X |
| 5,198,313 | 3/1993 | Juergens | 429/94 |
| 5,356,733 | 10/1994 | Green et al. | 429/72 |

*Primary Examiner*—Stephen Kalafut
*Attorney, Agent, or Firm*—Davis, Graham & Stubbs LLP

[57] ABSTRACT

An electrochemical cell and a method of manufacturing the same. Plates of opposite polarity are wound spirally and end connectors with protruding hubs are attached to each end. Elastomeric sleeves are fitted around both of the hubs. The assembly is placed within a casing having a jacket and an end with a hole through it, whereby one end connector hub and its associated sleeve extends through the casing end hole. The end connector hub is radially expanded against the sleeve by installing a blind rivet in the end connector hub, thereby causing the sleeve to radially expand into the casing. A casing cover having a hole through it is placed on the other end. A blind rivet similarly expands the end connector hub into its sleeve, and the sleeve is expanded into the cover. The plates may be of the very thin type, and the end connectors may be attached by casting them onto the thin plates.

16 Claims, 6 Drawing Sheets

5,677,078

METHOD AND APPARATUS FOR ASSEMBLING ELECTROCHEMICAL CELL USING ELASTOMERIC SLEEVE

FIELD OF THE INVENTION

This invention relates to a novel electrochemical battery and method for manufacturing the same, having superior recharge and discharge capabilities. Such electrochemical battery is comprised of ultra-thin plates and separators within a container.

BACKGROUND OF THE INVENTION

There have been dramatic improvements in the design and performance characteristics of compact hermetically sealed rechargeable electrochemical cells. These cells are typically configured either as a series of plates or in a spirally wound electrode assembly. The two commonly used chemical systems are the lead acid system and the nickel cadmium system.

Although the lead acid battery system has been known and utilized for many decades, solutions to many of the practical difficulties associated with using such cells were not proposed until the mid-1970s. One of the difficulties seen with early lead acid cells was related to the problem of keeping the electrolyte acid contained within the cell. It was necessary to maintain an excess amount of acid (generally sulfuric acid) in the cell in order to allow for overcharging of the electrodes during the recharge process. Overcharging leads to the production of hydrogen and oxygen within the cell which traditionally was vented from the cell. Electrochemical cells having vent means and free acid generally had to be held upright in order to prevent the acid from leaking from the cell.

An additional problem with traditional lead acid cells was in maintaining the physical characteristics of the lead plates within the cell. In order to put some "back bone" in the lead plates, lead containing up to one percent of calcium was often used in cells to give the plates some rigidity.

The breakthrough invention in lead acid cells is described in U.S. Pat. No. 3,862,861 of McClelland et al. The McClelland patent discloses the incorporation of several elements that combine to alleviate each of these problems associated with the traditional lead acid cell. The McClelland invention recognized the potential of utilizing the electrochemical recombination reaction. By capitalizing on the "oxygen cycle", a lead acid cell could be produced such that the electrolyte could be maintained in a "starved" condition. Rather than having an excess of electrolyte, the cell could be operated with a minimal amount of electrolyte present in the system. In order to maintain a starved condition, it is necessary to have sufficient absorbent material or pores within the cell to contain the electrolyte while still having space filled with gas.

By using relatively absorptive separator material McClelland was able to accomplish two distinct functions. The absorptive separator allowed the flow of gases and electrolyte between the positive and negative plates, thereby allowing the oxygen cycle to function. The absorptive separator also acts as a wick to hold the electrolyte within the cell without the necessity of having free electrolyte in the system.

McClelland also discloses a configuration of the plates and separator so that the elements are held tightly together. It was then possible to use considerably purer lead grids that are more corrosion resistant than the calcium-containing lead plates previously used. Venting means are included in the McClelland device as a safety release device to release excess pressure. However, since there is little or no non-absorbed electrolyte in the cell, there is almost no danger of acid leaking from the cell.

Prior to the development of the McClelland device, U.S. Pat. Nos. 3,395,043 and 3,494,800 of Shoeld disclosed the use of relatively thin lead plates in an electrochemical cell. The cells described in the Shoeld patents, being prior in time to the McClelland patent, did not use absorptive, gas permeable separators. The cells disclosed did not, therefore, utilize the oxygen cycle, were not maintained in a starved or semi-starved condition, and probably contained free electrolyte in order to function properly. The Shoeld patents do not indicate that the batteries produced would have superior discharge or recharge characteristics. Based on the techniques and materials available at the time of the Shoeld disclosures, it is quite unlikely that the cell disclosed therein would have had any significant advantages over existing cells. An example of an electrochemical cell in which a blind rivet is used to assemble the cell and to act as a conductor is U.S. Pat. No. 3,704,173 by McClelland, et al.

Since the McClelland patent, there have been several patents disclosing improvements to the fundamental cell disclosed therein. For example, U.S. Pat. Nos. 4,465,748 of Harris, 4,414,259 of Uba, 4,233,379 of Gross, 4,137,377 of McClelland and 4,216,280 of Kono each describe separators to be used in starved lead acid cells. U.S. Pat. Nos. 4,725,516 of Okada and 4,648,177 of Uba both identify cell parameters that lead to superior recharge/discharge characteristics in lead acid cells.

U.S. Pat. No. 4,769,299 of Nelson to a certain extent incorporates the inventions of Shoeld and McClelland. The Nelson patent describes the use of grid-like plates and absorptive gas permeable separators as described in McClelland with the extremely thin plates disclosed by Shoeld. The result is a lead acid cell with enhanced recharge/discharge properties.

The theoretical advantage of utilizing thin plates in electrochemical cells has been known for decades. The thinner the plates the less distance electrons have to travel within the plate during discharge, and, during recharge, the shorter distance of non-conductive material to be regenerated. To a certain extent, the thickness of plates utilized has been dictated by the available technology for the production and handling of thin lead films.

U.S. Pat. No. 5,045,415 by Witehira describes a lead-acid battery with extremely thin plates on the order of 5 to 20 micrometers thick (less than 0.001 inches). However, the plates are not interleafed negative and positive plates, but instead are sandwiched together to form thicker plates which, in turn, are interleafed.

U.S. Pat. No. 4,173,066 by Kinsman is for a laminar battery having a zinc coated cellophane substrate. Of course, the function of a cellophane substrate and the manufacturing concerns associated with it are much different from those of a metal foil substrate. U.S. Pat. No. 3,377,201 by Wagner is for a liquid electrolyte battery such as a lead-acid cell. One embodiment of the invention is a silver-zinc cell having a positive plate 0.010 inches thick but the negative plate is 0.025 inches thick. U.S. Pat. No. 3,023,260 by Coler is for a liquid electrolyte battery having an electrode with a thickness of 0.025 inches. U.S. Pat. No. 4,996,128 by Aldecoa is for a lead-acid battery having a foil thickness of "less than 0.010 inches". The porous paste thickness is not specified, but presumably is greater than the thickness of the foil, to make the total plate thickness in excess of 0.010 inches. Other references to so-called thin plate designs are U.S. Pat. No. 4,001,022 by Wheadon (referring to plates in excess of 0.010 inch thick) and U.S. Pat. No. 4,883,728 by Witehira (which describes the use of both thin plates and thick plates in a single battery to provide a variety of discharge characteristics).

The use of thin plates has been seen for some time in alkaline batteries such as nickel-cadmium batteries. For example, U.S. Pat. Nos. 4,963,161 by Chi, 4,937,154 by Moses and 4,539,272 by Goebel, describe alkaline batteries having thin plates. However, alkaline batteries normally are formed with plates of materials with higher tensile strengths than lead which are easier than lead to manufacture and handle in thin layers.

For much the same reasons that thin plates produce superior results, thin layers of reactive paste also lead to superior discharge/recharge characteristics. The Nelson patent discloses the use of both thin lead grids and thin layers of reactive paste. A basic shortcoming in the Nelson device is that the paste residing within the grid openings can have a greatly increased distance to the lead plate material. For example, in the Nelson patent the openings in the lead plate grid are constructed so that the distance from the center of the opening to the grid strands is significantly greater than the thickness of the paste layer on the face of the plate. Since the performance characteristics of electrochemical cells is proportional to the thickness of the lead plates and the thickness of the paste layer, the use of grids or other perforated sheets greatly decreases the efficiency of the cells.

The Nelson patent teaches away from a thin plate design using non-perforated plates, on the grounds that thin plates are prone to corrosion:

"To achieve optimum high rate discharge capability, in theory one would prefer to use thinner plates to reduce the current density on discharge. However, corrosion, particularly at the positive grid as aforementioned, has placed limitations on how thin plates can be made in practice."

Other patents on thin perforated plates include U.S. Pat. No. 4,999,263 by Kabata (which refers to films as thin as 3 micrometers coated with a polymeric material having a thickness of "1,000 micrometers or less"; U.S. Pat. No. 3,973,991 by Cestaro (referring to perforated lead foil 0.019 inches thick before the application of a coating); and U.S. Pat. No. 4,874,681 by Rippel (which refers to a woven perforated plate of strands with a 0.008 inch outside diameter or 0.005 inch outside diameter before application of any coating). Other art in the field includes U.S. Pat. Nos. 4,064,725 by Hug; 4,099,401 by Hug; 4,112,202 by Hug; 4,158,300 by Hug; 4,212,179 by Juergens; 4,295,029 by Uba; 4,606,982 by Nelson; 4,709,472 by Machida; 4,780,379 by Puester; Japanese Patent Nos. 58-119154 and 59-103282 and U.S.S.R. Patent No. 674124.

Of course, the prior art includes many references to thin plate capacitors. See, for example, U.S. Pat. No. 4,720,772 by Yamano. These patents are of marginal relevance, because they are not directed toward battery technology and the plate material is normally aluminum or nickel rather than lead.

Aside from the theoretical objections to thin plate lead-acid cells in the prior art, there are a number of practical obstacles to such designs. Thin lead plates are very fragile, making them difficult to assemble into a cell in an undamaged state with proper electrical continuity to the appropriate exterior terminals. To be economically feasible in the competitive battery market, the design and assembly of a commercial battery must be capable of automated processing such as robotic assembly machines. All these factors add difficulty, expense and uncertainty in the design and the assembly process. The difficulty does not end upon selecting a durable design that will withstand the rigors of automated assembly, many batteries such as power tool batteries operate in extremely harsh conditions in which they are subjected to impacts, vibration and temperature extremes. It is therefore desirable to develop a thin plate lead acid battery that is easily and reliably assembled using automated processes and is highly durable on harsh conditions of use.

SUMMARY OF THE INVENTION

The electrochemical cell of the present invention is characterized by the use of thin non-perforated plates having thin active material layers and thin absorptive separator material layers. In the optimum design, the cell is initially produced with an excess volume of electrolyte, but through processing, a volume of electrolyte is achieved in the cell, and the electrolyte volume is maintained, in an almost saturated condition with respect to the absorptive capacity of the separator and the electrode materials.

The cell of the present invention is characterized by an exceptionally high plate surface area to active material ratio. The cells are produced utilizing films of lead or other appropriate material approximately 0.002 inches thick. The active material or paste maintained on the surface of both sides of the sheet are approximately 0.001 to 0.003 inches thick. The inter-plate spacing is 0.005 or more inches. In one preferred embodiment, both the negative plate and the positive plate are of substantially non-perforated sheets having the thickness described above. In another preferred embodiment, one plate is of the thickness described above while the other plate is significantly thicker. In yet another preferred embodiment, one plate (the corroding plate) is a substantially non-perforated sheet while the other plate is perforated.

When manufacturing lead acid cells, the active material may be sulfated lead pastes or PbO and $Pb_3O_4$ or leady oxide for the positive plates, and PbO or leady oxide or sulfated lead pastes for the negative plates. When utilizing sulfated pastes, the specific gravity of the fill electrolyte is about 1.28 to 1.32. The lead films of the plates are preferably greater than 97% pure. If containing tin, the films may be from about 0.50% to 2.5% tin. If tin is not used, the lead is approximately 99.99% pure.

Any number of separator materials known in the art may be utilized with the present invention. One suitable glass microfiber material consists of 90% fibers 1 to 4 microns in diameter and 10% of larger fibers existing as a woven or non-oriented mat. Examples of acceptable separator materials are described in U.S. Pat. Nos. 4,233,379 of Gross et al. and 4,465,748 of Harris.

The surface of the electrode films may be physically roughened to increase the adhesion of the thin layer of active material to the film surface and to further increase the surface area of the films. Alternatively, the films may be textured in the rolling process by using a textured roller.

The cell in the preferred embodiment utilizes a cast-on end connector to mechanically and electrically connect the thin plates to the cell terminals. The end connectors at each end of the cell extend through an insulating cell case and other elements are assembled using a blind rivet in each end connector. The rivet body extends from outside the cell case into a hub formed in the end connector. The rivet body is expanded, thereby exerting an outward force against the end connector hub.

An electrically insulating elastomeric sleeve, such as one made of rubber, surrounds each end connector hub. The top end connector sleeve is surrounded by the cell case and the bottom end connector is surrounded by the cell case cover or cap. The expansion force exerted by the rivet on the end connector hub is transmitted to the sleeve as the hub deforms away from the rivet, and the sleeve compresses between its associated end connector hub and the cell case or cell case cover. Since the sleeves are elastomeric, the compressed sleeves seek to regain their original uncompressed shape. As the cell case, cell case cover, and rivet are all rigid, the sleeve cannot regain its original shape and therefore exerts a force against the cell connector hub on the inside of the sleeve and the cell case or cell case cover on the outside of the sleeve. This produces a fluid-tight seal between the end connector hubs and the cell case and cell case cover. It also serves to securely attach the cell case and cell case cover to the end connectors. The expansion of the blind rivet in the end connectors produces a durable permanent electrical connection between the rivet body and the end connector, so that the rivet body flange can function as the exterior electrical terminal.

The elastomeric sleeve preferably includes an inner flange extending radially from the end inside the cell to isolate the end connector hub from the cell case and cell case cover and to assist in establishing a fluid-tight seal between the end connector hub and the cell case and cell case cover. An outer flange extending radially from the end of the elastomeric sleeve that is outside the cell isolates the rivet body flange functioning as the electrical terminal from the cell case and cell case cover, and also assists in establishing the fluid-tight seal between the end connector hub and the cell case and cell case cover. The inner and outer flanges of the elastomeric sleeve improve the mechanical connection between the cell case or cell case cover and the end connectors. A portion of the cell case or case cover is pinched between the two flanges, so that the cell case or cover is compressed along the length of the sleeve as well as being compressed radially by the sleeve. While this strengthens the static cell connections, it is particularly effective in reducing damage to the cell arising from impact or vibration. The elastomeric flanges act as shock absorbers, which may compress and decompress as the cell is subject to vibration. The energy expended and inertial force reduction resulting from compressing and decompressing the flanges reduces the impact on the end connector, and consequently on the other internal elements of the cell. The cell case and cell case cover may be plastic, metal or other material. Preferably it is a material such as polypropylene that is fluid-tight and resistant to water transpiration.

The cell may be filled using filling systems known in the art. In a preferred embodiment, a novel filling system is employed using a filling port in the cell case cover. After filling is completed, the port is plugged with a plug that is ultrasonically welded into place. In the cell case, on the end opposite from the cell case cover, is an elastomeric valve covering a valve port, held in place by an ultrasonically welded cover ring. Excess pressure in the cell can escape through the valve port by deforming the elastomeric valve and thereby vent to the atmosphere.

A set of vanes may extend axially from the cell case end and the cell case cover toward the end connector. The vanes help hold the assembled plates end and connectors in place and absorb impact produced by the end connector striking the interior of the cell.

The electrochemical cell of the present invention demonstrates dramatic improvements in recharge/discharge capabilities over prior art cells produced as described in the various references cited above. Maximum current capabilities are increased and the current value remains at near its maximum throughout a longer period of its discharge profile. Recharge times are also reduced dramatically. Recharge can be accomplished at currents up to 40C (or forty times the amp hour rating of the cell). The cell is relatively easy and inexpensive to fabricate and assemble, and is capable of enduring hard use without damage.

DESCRIPTION OF THE PREFERRED EMBODIMENTS

According to the present invention, an electrochemical cell having both excellent charge and discharge characteristics is described. Technological breakthroughs in the fields of thin film handling and fabrication have made it possible to create high rate electrochemical cells that have performance characteristics that are unprecedented in the field. In certain ways, the electrochemical cells of the present invention are constructed along the lines of standard electrolytic capacitors rather than standard batteries, in the sense that they employ extremely thin plates. Handling such thin films and incorporating the same into functional electrochemical cells was previously thought to be impossible.

Utilizing ultra-thin films of either lead (for lead acid systems) or nickel (for cadmium nickel systems) in combination with extremely thin layers of active material, it is possible to create cells that have very high utilization of the active material, even at extreme discharge rates. Therefore, even under extreme loads there is little voltage drop within the plates of the cell. The present invention describes electrochemical cells with quite low plate current densities and low connector current densities, thereby reducing heat creation.

The electrochemical cell of the present invention is composed of ultra-thin films of an electrochemically active metal that are coated on each side with an electrochemically active paste. Preferably, the positive film (which is the corroding element) is substantially non-perforated while the negative film may be either perforated or non-perforated. The positive and negative plates of the electrochemical cell are maintained apart from each other by separator material. The separator material also acts to absorb the electrolyte that is contained in the enclosed cell system.

Figure 1:
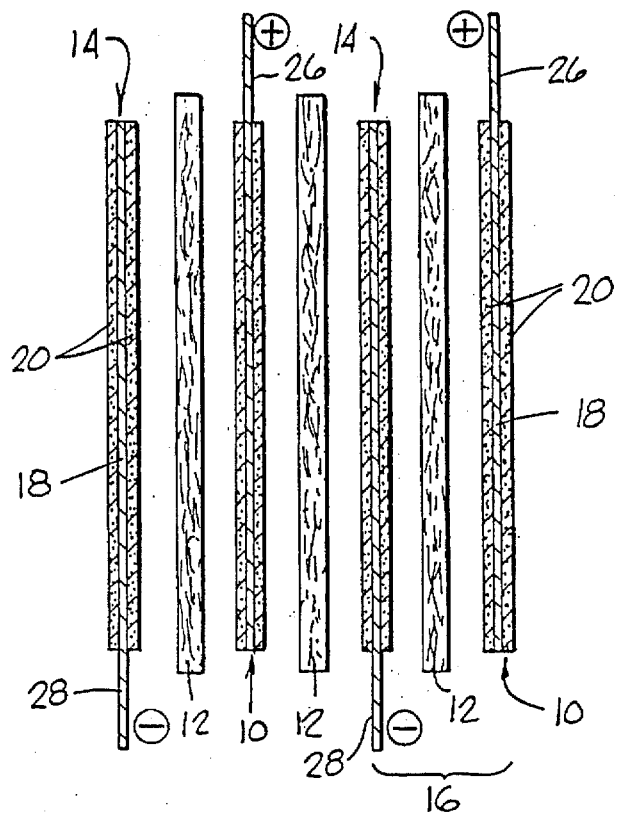
FIG. 1 is a diagrammatic vertical cross-sectional view of alternating positive and negative plates that are separated by layers of separator according to one embodiment of the present invention.

A diagrammatic view of a cell unit according to the present invention is seen in FIG. 1. Negative plate 14, separator 12 and positive plate 10 constitute an electrochemical unit 16. The negative plate 14, and optionally the positive plate 10, each consist of an ultra-thin film 18 of either lead or nickel partially coated on both major faces with a layer of a suitable electrochemically active paste 20. According to the present invention, the films 18 utilized in the negative plate of the electrochemical cell are about 0.005 inches thick. In the preferred embodiments, the negative films 18 are about 0.0015 to 0.0030 inches thick. Utilizing such thin films of active material, it is possible to greatly increase an important variable in such electrochemical cells, the ratio of surface area of film to the amount of active paste material. In the present invention, cells having greater than 26.0 square centimeters of surface area per gram of active material are described. In fact, in a preferred embodiment, there are up to 50 square centimeters or more per gram of active material.

A thin layer of the active material paste 20 is applied to a large portion of both major faces of the negative and positive films 18. Each layer is, preferably at most, 0.005 inches thick, and in the most preferred embodiments of the invention, the layers of active material paste 20 are about 0.002 to 0.003 inches thick or less. The negative plate and, optionally, the positive plate, each have a total thickness of film plus paste of preferably no more than 0.010 inches. In the most preferred embodiment the thickness is about 0.005 to 0.008 inches, with an interplate spacing of about 0.005 or more inches. As used herein, the "plate" refers to the film together with the paste that is applied to the film, while the "film" refers to the film not including the applied paste. Thus, a film that is, for example, 0.002 inches thick and coated on both sides with a paste that is 0.001 inches thick, results in a total plate thickness of 0.004 inches.

In each unit cell 16, the negative plate 14, the separator 12 and the positive plate 10 are in a specific physical relation as seen in FIG. 1. Both major faces of the films 18 are coated with active material paste 20, except along alternating horizontal edges 26 and 28 where there is left a bare strip about a tenth inch wide. On the negative plate 14, the portions of the major faces 28 adjacent to the lower horizontal edge are not coated with the active material paste 20, and on positive plate 10, the portion of the major faces 26 adjacent to the upper horizontal edge are not coated with the active material paste 20.

The separator 12 extends beyond the coated portions of both the negative plate 14 and positive plate 10 in order to separate the plates effectively. However, the separator does not extend as far as the end of the uncoated portions 26 and 28 of the positive plate 10 and negative plate 14, respectively. Thus, those uncoated portions can receive the end connectors in the manner described below. The cell could, of course, be constructed so that the relative position of the positive and negative plates are reversed.

In an embodiment of the invention wherein a "D" size cell is produced, the negative and positive films 18 are each about 1.5 inches high. The uncoated ends extend about one-fourth inch beyond the coated plate of opposite polarity, and the separator 12 extends about one-eighth inch beyond the coating of each plate.

The surfaces of the film 18 that are to be coated may be textured prior to application of the active paste 20. The texturing may be accomplished in the rolling of the films by using a textured roller. This allows for a better adhesion between the paste and the film.

Figure 2:
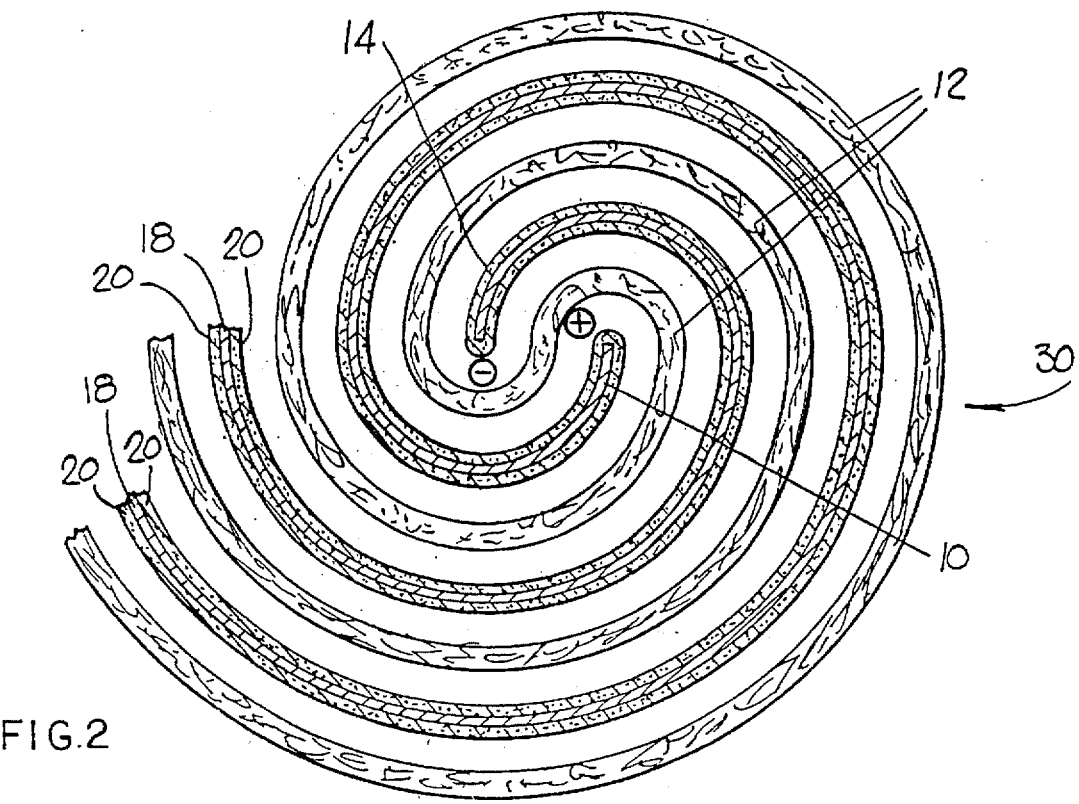
FIG. 2 is a diagrammatic horizontal cross-sectional view of a spirally wound cell unit according to one embodiment of the present invention.

In the preferred embodiment of the invention, the electrochemical cell is constructed of a single spirally wound unit cell as shown in FIG. 2. Of course, the invention could also be employed utilizing parallel stacks of any number of unit cells. In the spirally wound configuration 30 of FIG. 2, a single continuous sheet of separator 12 may be employed to separate the negative 14 and positive 10 plates from each other.

Figure 3:
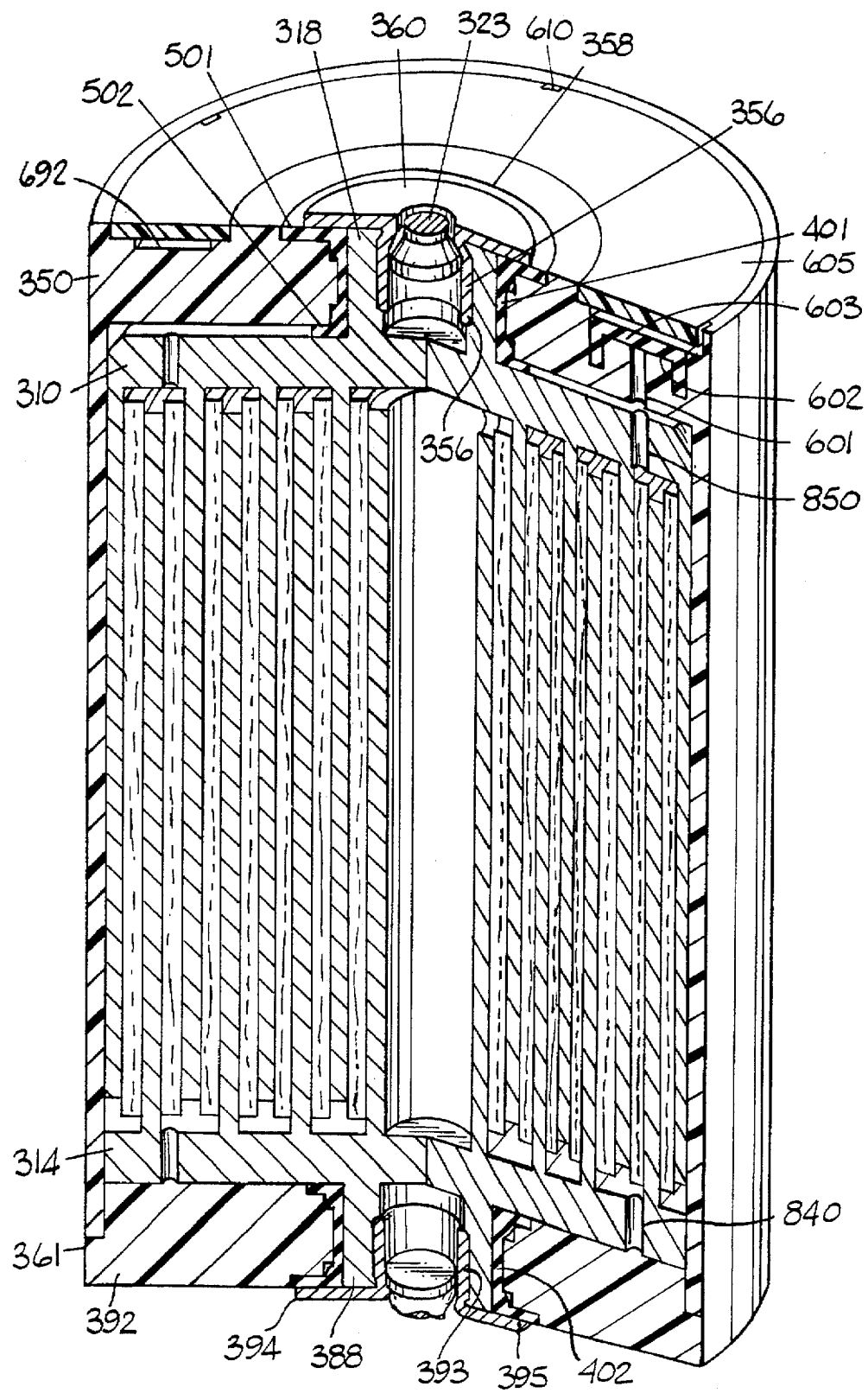
FIG. 3 is a pictorial, partial cross-sectional view of a spirally wound cell unit in accordance with the present invention.
Figure 5A:
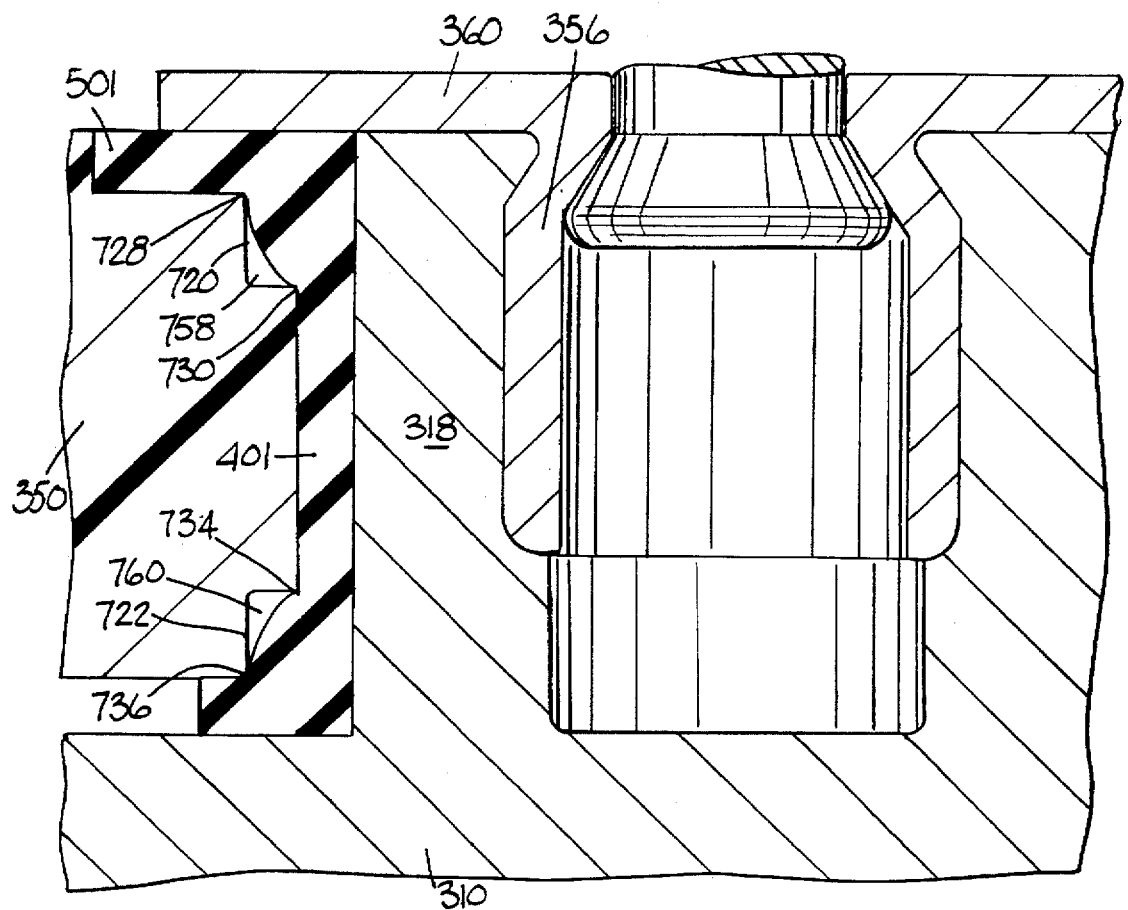
FIG. 5A is a cross sectional detail of the invention.
Figure 4A:
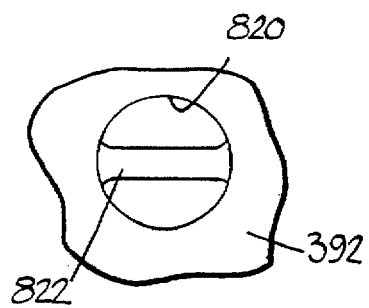
FIG. 4A is a cross sectional detail of the invention along 4A—4A of FIG. 4.
Figure 4:
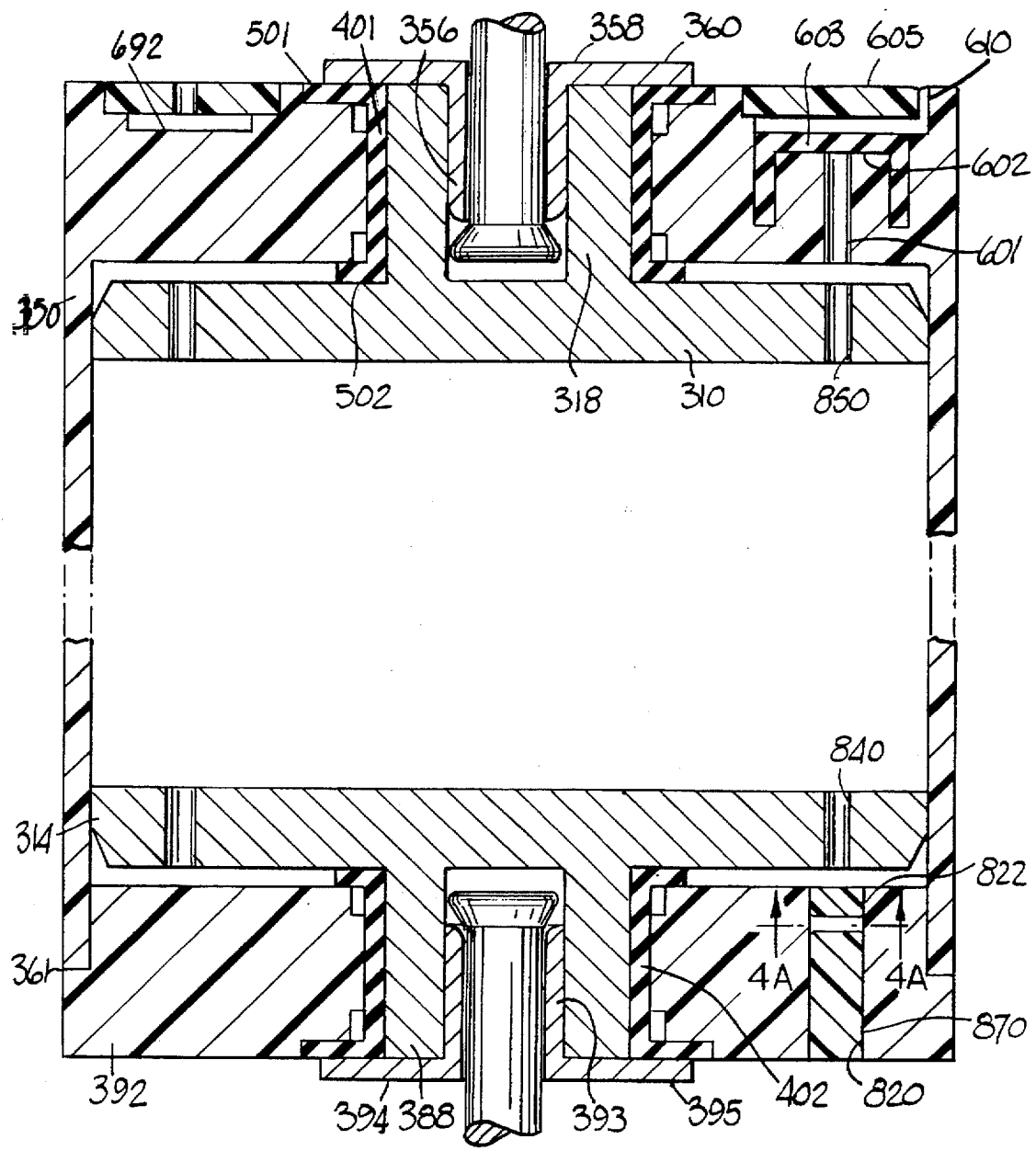
FIG. 4 is a cross-sectional view of a cell in accordance with the present invention, before being fully assembled.
Figure 5:
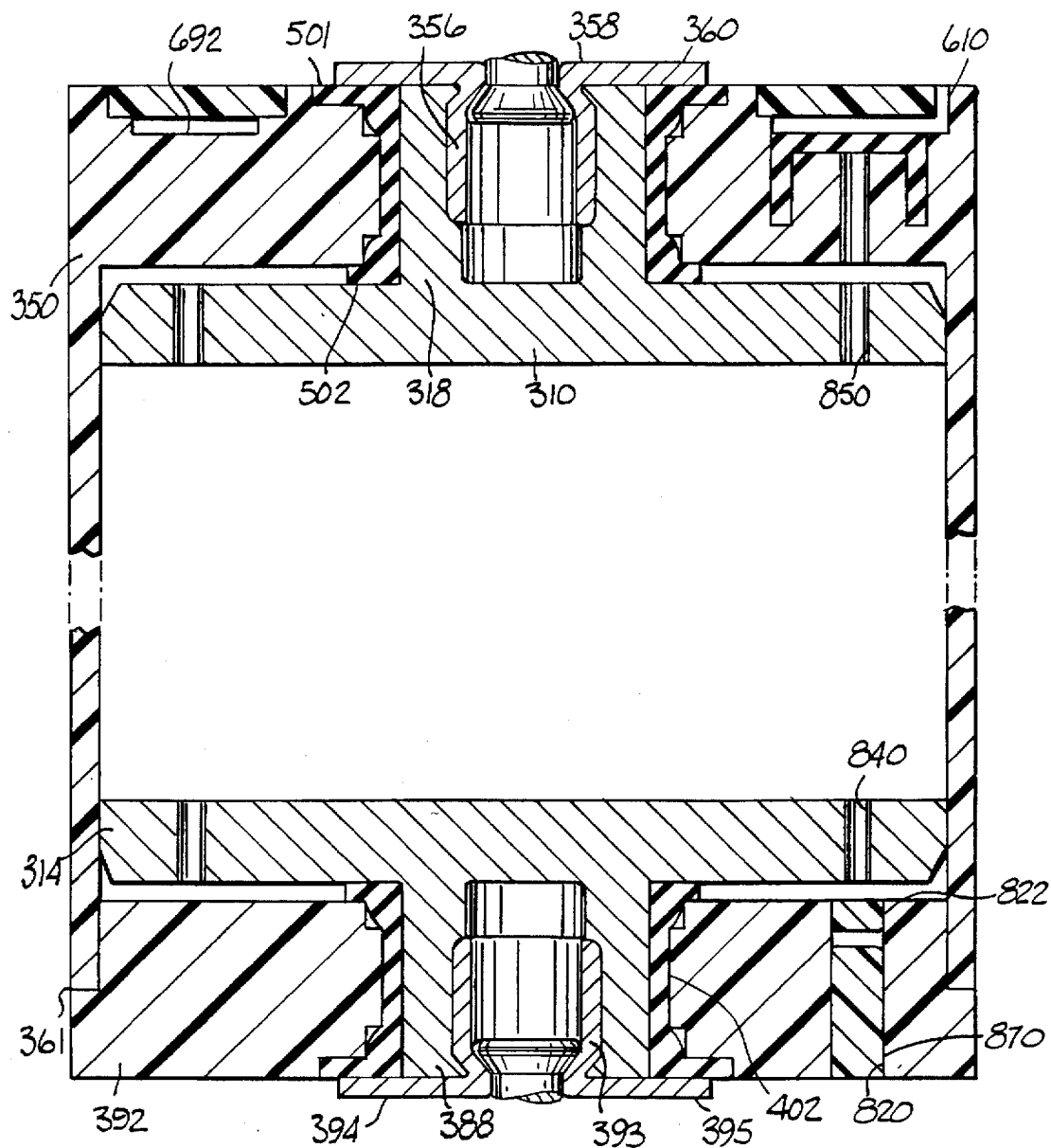
FIG. 5 is a cross-sectional view of a fully assembled cell in accordance with the present invention.

FIG. 3 is a pictorial, cutaway view of the cell. FIG. 4 shows side sectional views of the two ends of the cell, with the plates omitted for clarity, before complete assembly, and FIG. 5 shows the same views after assembly and after filling of the electrolyte. FIGS. 3–5 show the plates attached to cast-on end connectors in a manner similar to that described in U.S. application Ser. No. 07/757,447 filed Sep. 10, 1991 for Battery End Connector, now issued as U.S. Pat. No. 5,198,313, and the details of the casting process can be found by reference to that patent.

The cast-on positive end connector 310 shown in FIGS. 3–5 has a center hub 318 which extends through a center hole in a non-conductive cell case 350. An electrically insulating elastomeric sleeve 401 surrounds the end connector hub 318 and is surrounded itself by cell case 350. The sleeve 401 includes an outer radially extending flange 501 and an inner radially extending flange 502. The outer flange 501 extends from the end of the sleeve 401 radially outward and over part of the end of the cell case 350. The inner flange 502 extends from the other end of the sleeve 401 radially outward between the end connector 310 and the end of the cell case 350. The sleeve 401 is compressed in the radial direction between the end connector center hub 318 and the cell case 350 in the manner described in more detail below.

A hole in the center hub 318 of the positive end connector 310 is filled by blind rivet 358. Blind rivet 358 has a rivet body 356 which extends into the hole and has a flange 360 extending over the hub 318 and partially over the outer flange 501 of the sleeve 401. The rivet body is expanded radially against the hole in the end connector center hub 318 by the withdrawal of the rivet mandrel 323 as explained below.

The comparison between FIG. 4 and FIG. 5 best shows the installation of the blind rivet. The inside of the rivet body 356 is expanded into the connector center hub 318 when the rivet mandrel 323 is pulled out of the rivet body 356. The center hub 318 is forced away from rivet body 356 and is therefore forced against the sleeve 401. Since the cell case 350 and the rivet body 356 are both relatively rigid, the sleeve becomes compressed and exerts an outward force in all directions. Note that the hub 318 must be somewhat deformable so that it is biased by the rivet 358 into the sleeve 401. This deformation is easily achieved in the preferred embodiment, because the hub 318 is of the same material as the rest of the end connector 310, namely a fairly soft lead alloy. The expansion of the rivet and the concomitant compression of the sleeve 401 provide a secure mechanical connection between the rivet body 356 (which acts as a cell electrical terminal), the hub 318 and the case 350. It also provides a reliable electrical connection between the rivet flange 358 and the end connector 310, and provides a fluid-tight seal between the cell case 350 and the hub 318.

It can be appreciated that the seal between the cell case 350 and the hub 318 is enhanced by the elasticity of the sleeve 401. An advantage to using an elastomeric sleeve 401 is that the sleeve 401 will contour itself to maximize surface area contact with the structures that it abuts, as shown in the detail of FIG. 5A. The sleeve 401 is tightly compressed between the hub 318 and cell case 350 by the radial expansion of the hub 318 produced by the expansion of the rivet body 356, to produce a very tight seal with the cell case 350. The seal is enhanced even further in the preferred embodiment by the configuration of the radial inner surface of the cell case 350. That surface includes an upper annular notch 720 and a lower annular notch 722. The upper annular notch 720 defines a pair of upper annular notch corners 728 and 730, and the lower annular notch 722 defines a pair of lower annular notch corners 734 and 736. The expansion of the sleeve 401 radially outward produces extreme compression at these corners to further ensure a good seal. The expansion also urges the elastomeric material of the sleeve 401 into any imperfections or voids. As seen in FIG. 5A, that tends to flow the material into the space 758 and 760 between the cell case 350 and sleeve 401. Sleeve 401 will contour itself because it is compressed and will expand to fill any interstices that may result from imperfect shaping of the portions of the cell case 350 or the top connector 310 that abut the sleeve 401, provided the interstices are sufficiently small. This reduces the likelihood of battery leakage and strengthens the cell connections. The outer flange 501 and inner flange 502 enclose a portion of the cell cover 350 and allow the sleeve 401 to compress the cell case 350 and the end connector 310 along the length of the sleeve 401 as well as radially outward. This multidirectional compression of the sleeve 401 improves the mechanical connection, and hence the electrical connection, of the cell. The flanges 501, 502 are particularly useful in preventing vibrational damage that may otherwise result, by absorbing energy that would otherwise be transmitted to the less resilient end connector 310 and the attached internal cell elements.

The bottom of the cell is essentially similar to the top with regard to the interface of the rivet in the cell, as shown in the bottom portions of FIGS. 3–5. A negative end connector 314 has a center hub 388 which extends through a center hole in cell case cover 392. The bottom hub 388 has a hole which receives the rivet body 393 of a bottom blind rivet 394 having a flange 395 that extends radially over the bottom hub 388 and partially over the bottom sleeve 402. The bottom rivet body 393 is expanded against the inside of the bottom hub 388 which forces the bottom hub 388 into the sleeve 402. This creates a strong compression fit between the negative end connector 314, the bottom rivet body 394, and the cell case cover 392. The cell case cover 392 is ultrasonically welded to the cell case 350 at a circumferential joint 361 to hold the assembly together.

The cell is preferably filled from the side of the cell case cover 392. As best shown in FIGS. 4–5, the cell case cover includes a port 820. As shown in the end view of FIG. 4A, the port 820 is generally cylindrical, but divided by a cross member 822 at the bottom thereof. The cross member 822 acts to disperse electrolyte as it is introduced into the cell. A plurality of end connector ports 840 extend through the end connector 314 that is on the end of the cell having the cell case cover 392, to allow electrolyte introduced through the filling port 820 to flow through the end connector 314 and into the region of the plates. A set of end connector ports 850 extend through the end connector 310 that is on the opposite end of the cell. Those ports 850 are not to allow electrolyte introduced through the filling port 820 to flow through the end connector 310, since the filling port is on the other end of the cell, but are instead to allow fluid and pressure communication from the cell interior through the end connector 310 to the relief valve 603 as explained below. The filling port is plugged after the filling operation by a filling port plug 870 which is a plastic plug permanently press fitted or ultrasonically welded into the filling port 820.

Figure 3A:
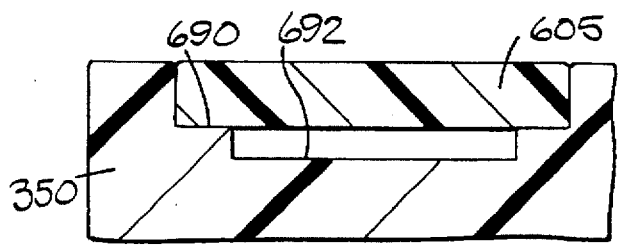
FIG. 3A is a cross sectional detail of the invention.

The cell is vented by a relief valve shown in FIG. 3. The valve includes a elastomeric cup-shaped valve 603 which seats in a valve seat 602. The valve 603 covers a valve port 601 and is held in place by the valve cover 605 which is ultrasonically welded, adhered or otherwise attached to the cell case 350. As shown in the detail of FIG. 3A, the cell case 350 receives the valve cover 605 in an annular notch 690. The bottom of the annular notch 690 has a trough 692 which allows communication of pressure, gas and fluid from the valve 603, around the annular notch 690. A set of notches 610 are spaced around the cell case 350 where it joins the valve cover 605. The notches 610 extend from the exterior of the cell to the trough 692 to allow pressure released from the valve 603 to be communicated to the atmosphere.

The cell is preferably assembled as follows. The positive and negative end connectors 310 and 314 are cast onto the positive and negative plates respectively. The elastomeric sleeve 401 is positioned within the cell case 350. The plates with the cast-on end connectors are then slid into the cell case 350 and seated so that the elastomeric sleeve is in the hole in the cell case, between the cell case 350 and the end connector hub 318. The sleeve outer flange 501 is thus partially over the cell case 350. A blind rivet 358 is inserted into the hole in the center hub 318. The rivet mandrel is withdrawn so that the rivet body 356 expands radially outward against the center hub 318 of the end connector 310 as shown in FIG. 5. This expansion presses the center hub 318 against the sleeve 401, and the sleeve 401 compresses against the cell case 350. A secure mechanical connection is produced between the rivet 358 and the end connector 310 and between the end connector 310 and the cell case 350. A good electrical connection is produced between the rivet body 356 and the end connector hub 318, so that the rivet body flange 360 can function as the cell electrical terminal. Finally, a reliable seal is produced between the end connector 310 and the cell case 350 by the elastomeric sleeve, to ensure fluid tightness. The rivet mandrel then breaks, leaving the end of the mandrel 323 within the rivet. The installation of the rivet simultaneously (1) assembles the cell case 350 to end connector 310, (2) installs an electrical terminal, and (3) seals this end of the cell.

The relief valve is installed by seating the valve 603 over the valve port 601 in the valve seat 602. The valve cover 605 is then placed over the valve 603 in the annular notch 690, and is welded or otherwise permanently attached thereto.

The bottom of the cell is assembled in a similar manner as the top. The elastomeric sleeve is positioned in the hole in the cell case cover 392. The cell case cover 392 is seated onto the bottom end connector 314 with the sleeve 402 therebetween. The cell case cover 392 is then welded (as by, for example, ultrasonic welding) to the cell case 350 at the circumferential joint 361. A blind rivet 394 is placed into the hole of the center hub 388 of the end connector 314, and the rivet mandrel is withdrawn until the mandrel breaks as shown in FIG. 5. A compression fit is thereby produced between the rivet body 393 and the end connector center hub 388, the hub 388 and the sleeve 402, and between the sleeve 402 and the cell case cover 392. As in the sleeve 401 at the other end of the cell, this produces a secure mechanical assembly, electrical communication to the rivet 393, and a fluid-tight seal.

The cell is filled by injecting electrolyte through the filling port 820 in the cell cover 392. This may be accomplished with a filling spout to mate with the cross member 822 in the filling port 820. The cross member 822 in the filling port 820 (see FIG. 4A) disperses the electrolyte so that it flows around the end connector surface and through the end connector ports 840 into the cell interior to wet the plates and absorptive separators.

The cell may also be designed for a "flow through" filling process. In that process, one end of the cell has one or more drain ports similar to the filling port in the other end of the cell so that electrolyte can be flowed into the cell. Such a configuration allows electrolyte to flow through into the cell, the filling ports and out of the cell through the drain ports. A predictable amount of electrolyte is absorbed by the separators, in order to achieve high electrolyte uniformity in the cell. Both the filling ports and drain ports are then sealed in an appropriate fashion, such as by the sealing method described above.

For lead acid electrochemical cells, there are a number of widely known combinations of active material pastes that are typically used. Any of these commonly utilized systems would be appropriate for use with this invention. For example, sulfated PbO pastes used on both the positive and negative plates provide a satisfactory system, as does the use of PbO and $Pb_3O_4$ on the positive plate and PbO on the negative plate. The use of litharge, red lead or leady oxide is also possible. The important factor is that the active material paste be of a nature so that it can be applied to the ultra-thin layer, as described above.

As is commonly seen in the new generation of the lead acid cells as exemplified in the McClelland and Nelson patents, the use of an absorbent, permeable separator, which permits gas transfer, it critical. As described above, there are several separator materials that have been disclosed for use specifically with lead acid system electrochemical cells. For the purposes of the present invention, any of the commonly used absorbent separators will work suitably. In one preferred embodiment, the separator is a glass micro-fiber which is about 95% porous in the uncompressed state and wherein 90% of the fibers are 1–4 microns in diameter.

When utilizing the lead acid system, the lead film 18, at least at the negative plate, may be about 97 to 99.99% pure, with the rest being tin or other metals. As described above, the lead film for each embodiment 18 is about 0.005 inches or less thick, and is preferably about 0.003 to 0.0015 inches thick.

When sulfated lead oxides are used as the active material paste, the specific gravity of the sulfuric acid electrolyte solution used is between 1.20 and 1.32. The type of vent used on the electrochemical cell may be similar to those described in the literature and known by those with ordinary skill in the art, and operates to vent excess gases when the internal pressure exceeds a certain level. Some internal pressure (above atmospheric) will be maintained when the cell is in its normal operational state. In its operable state, the cell of the present invention is maintained so that the total void volume of the compressed separator and the active material is not totally filled, so that there is no free electrolyte present.

EXAMPLE

Figure 6:
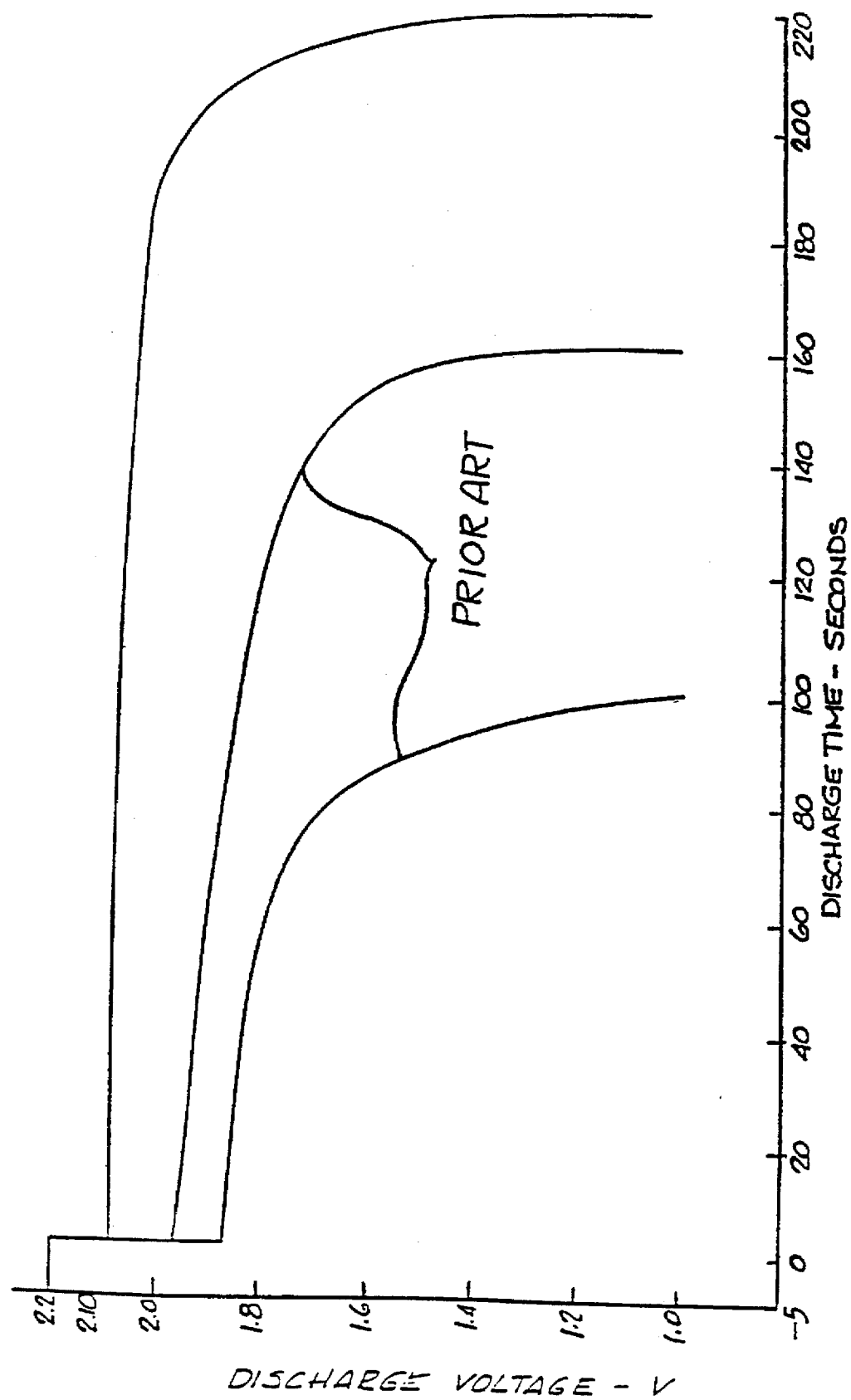
FIG. 6 depicts discharge curves comparing cells of this invention with conventional cells.

As mentioned previously, electrochemical cells produced according to the present invention have distinctly superior discharge and recharge capabilities. FIG. 6 shows the discharge curve for a lead acid electrochemical cell according to an embodiment of the present invention in comparison with discharge curves for the cells described in U.S. Pat. No. 3,862,861 of McClelland et al. (the lower line of the two prior art lines) and U.S. Pat. No. 4,769,299 of Nelson (the upper line of the two prior art lines). As can be seen, the improved performance is more than just an incremental increase.

The electrochemical cell used to create the discharge curve seen in FIG. 6 has the following characteristics: a non-perforated lead film for both the positive plate and negative plate was composed of 99.50% lead and 0.50% tin; the lead films were 0.002 inches thick and were coated with a layer of 0.002 inches thick of sulfated pastes—the total plate thickness being 0.006 inches; the electrolyte was sulfuric acid with a specific gravity of 1.28; the glass micro-fiber separator was 95% porous in its uncompressed state and contained 1–4 micron diameter fibers and larger fibers up to 1 inch in length and had a specific surface area of less than 2 $m^2/g$. In a "D" sized electrochemical cell, the lead films would be 45 inches long and 1.5 inches high, and there would be about 26.0 $cm^2$ of surface area for each gram of active material paste.

The cells of the present invention can be recharged at extremely high rates relative to cells currently available. As long as significant overcharging is not allowed, the cells can be recharged at up to 10C, or ten times the rated capacity of the cell.

What is claimed is:

1. An electrochemical cell, comprising: interleaved sets of plates of opposite polarity wound into a spiral having a first plate end and a second plate end opposite the first plate end; a casing encasing the plates, the casing having a first casing end over the first plate end and a second casing end over the second plate end; a first end connector attached to the first plate end with a hub having a hole therein extending through a hole in the first casing end; a first insulating elastomeric sleeve positioned in said first casing end hole and compressed between said and hub and said first casing end; and further comprising an expansion member in said hole expanded radially outward to deform said first end connector hub radially outward to radially compress said elastomeric sleeve between the first end connector hub and the first casing end; said expansion member being a blind rivet including a rivet body positioned within said first end connector hub hole and a rivet flange outside of said hole and extending radially, said rivet being in electrical communication with the first end connector and the rivet flange being an electrical terminal for the cell, the rivet body being substantially cylindrical and hollow and adapted to receive a rivet mandrel to expand the rivet body radially outward; and, wherein the elastomeric sleeve includes an inner flange extending radially outward between the first end connector and the first casing end, and an outer flange extending radially outward between the first casing end and the rivet flange; the first end connector having an annular recess to receive the outer flange so that outer flange is flush with a section of the first casing end.

2. The cell of claim 1, wherein the inner flange is compressed between the first end connector and the first casing end, and the outer flange is compressed between the first casing end and the rivet flange, thereby insulating the first end connector from vibrational effects.

3. The cell of claim 1, wherein the first casing end has a notch adjacent the outer flange and a notch adjacent the inner flange.

4. The cell of claim 3, wherein the outer flange extends further radially than the inner flange.

5. The cell of claim 3, further comprising a second end connector attached to the second plate end with a hub extending through a hole in the second casing end; and a second insulating elastomeric sleeve positioned in said second casing end hole and compressed between said hub and said second casing end.

6. The cell of claim 3, wherein said first end connector is cast onto said first plate end.

7. The cell of claim 3, wherein at least some of said plates are less than 0.01 inches thick.

8. The cell of claim 3, herein one of said first casing end and second casing end includes a pressure release valve, said pressure release valve including a valve port extending through the casing end, a valve cover over the valve port, and a deformable valve cap biased between the valve cover and valve port.

9. The cell of claim 8, wherein the valve cap is seated in a valve cap seat between the valve port and valve cover.

10. The cell of claim 9, wherein the valve cover is annular shaped and mounted in an annular notch in the casing end, the casing end and annular valve cover defining a space therebetween for the passage of pressure from the valve port therethrough to the atmosphere.

11. The cell of claim 10, wherein the annular valve cover and the casing end define a set of vents extending from said space to the atmosphere.

12. The cell of claim 11, wherein one of said first casing end and second casing end includes an electrolyte filling port extending therethrough to introduce electrolyte into the cell, the filling port being permanently sealable.

13. The cell of claim 12, wherein said filling port includes a cylindrical opening having a member extending across the opening to define two passageways to disperse electrolytes as it flows through the opening.

14. The cell of claim 13, wherein the filling port is plugged with a plug permanently mounted therein.

15. A method of manufacturing an electrochemical cell, comprising: winding sets of plates of opposite polarity into a spiral winding having a first plate end and a second plate end; attaching a first end connector to the first plate end, the first end connector having a protruding first hub; placing a first insulating elastomeric sleeve into a first hole extending through a first end of a cell casing; encasing the winding in the cell casing whereby the first end connector hub expands into the first sleeve; and expanding a rivet within the first hub to compress the first sleeve and produce a seal between the fist casing end and the first end connector; wherein the elastomeric sleeve has an inner flange and an outer flange, and the cell case has notch around the first hole to receive the outer flange flush with the cell case after the sleeve is placed.

16. The method of claim 15, further comprising the step of introducing electrolyte into the cell through a fill port extending through the end connector and second end connector, the fill port having a member extending thereacross to form two passageways therethrough.

* * * * *